United States Patent
Watson et al.

(10) Patent No.: US 10,318,718 B2
(45) Date of Patent: Jun. 11, 2019

(54) VOICE AUTHENTICATION WITHIN MESSAGING SYSTEMS

(71) Applicant: NCR Corporation, Duluth, GA (US)

(72) Inventors: Patrick Goode Watson, Johns Creek, GA (US); Yehoshua Zvi Licht, Alpharetta, GA (US); Nir Veltman, Johns Creek, GA (US); Brent Vance Zucker, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 251 days.

(21) Appl. No.: 15/274,947

(22) Filed: Sep. 23, 2016

(65) Prior Publication Data

US 2018/0089407 A1    Mar. 29, 2018

(51) Int. Cl.
G06F 21/32    (2013.01)
H04L 29/06    (2006.01)
G10L 17/24    (2013.01)

(52) U.S. Cl.
CPC .............. *G06F 21/32* (2013.01); *G10L 17/24* (2013.01); *H04L 63/0861* (2013.01)

(58) Field of Classification Search
CPC .............................. H04L 63/0861; G06F 21/32
See application file for complete search history.

(56) References Cited

U.S. PATENT DOCUMENTS

| 6,144,756 | A * | 11/2000 | Takahashi | G06K 9/0002 340/5.86 |
| 7,054,819 | B1 * | 5/2006 | Loveland | G06F 21/32 345/419 |
| 7,571,100 | B2 * | 8/2009 | Lenir | G06F 21/32 379/88.01 |
| 2006/0174332 | A1 * | 8/2006 | Bauban | G06F 21/31 726/5 |
| 2010/0115114 | A1 * | 5/2010 | Headley | G06F 21/32 709/229 |
| 2012/0281885 | A1 * | 11/2012 | Syrdal | G10L 17/24 382/116 |
| 2013/0311190 | A1 * | 11/2013 | Reiner | G10L 25/48 704/270 |
| 2013/0347129 | A1 * | 12/2013 | Samuelsson | H04L 9/321 726/28 |
| 2014/0156697 | A1 * | 6/2014 | Miller | G06F 17/30823 707/769 |
| 2016/0373581 | A1 * | 12/2016 | DiPietro | H04M 3/5191 |

OTHER PUBLICATIONS

Notenboom, "How do I change my Gmail password?", Aug. 2014,pp. 1-7, https://askleo.com/how-do-i-change-my-gmail-password/ (Year: 2014).*

* cited by examiner

*Primary Examiner* — Theodore C Parsons
*Assistant Examiner* — Carlos M De Jesus Lassala
(74) *Attorney, Agent, or Firm* — Schwegman, Lundberg & Woessner (57) ABSTRACT

A user is initially trained for voice authentication within a messaging platform session. After training and during the same session or a different session with the messaging platform session or with a different messaging platform, and when the user requests during such session a sensitive operation be performed on behalf of the user with an external service, a randomly generated voice challenge is delivered to the user during that session. If a returned voice recording from the user is authenticated in response to the issued voice challenge, then the sensitive operation is performed on behalf of the user during the session.

20 Claims, 8 Drawing Sheets

VOICE AUTHENTICATION WITHIN MESSAGING SYSTEMS

BACKGROUND

Individuals and businesses utilize a variety of messaging technologies to: socialize, communicate, and engage in business activities. Some of these messaging technologies include: email platforms, text platforms, instant messaging platforms, browser-based platforms, and a variety of social media platforms. Each specific type of messaging platform has its own set of interfaces and features, some of which may be device-type specific or may work better (with more features) on a given device type. Furthermore, most messaging platforms include their own Application Programming Interfaces (APIs) that permit automated and program-based interaction with features of the messaging platforms.

As a result, businesses have little useful metrics as to how consumers are using messaging platforms to engage in activities with the businesses beyond direct interactions between an individual and a business over a specific messaging platform. The problem with this is that the messaging activity by an individual prior to that individual engaging a business is essentially unknowable with present technology and technology approaches.

Moreover, when an individual is engaged in an active session with a messaging platform from which a business has never had activity with the individual before, the business has no way of reaching out to the individual for purposes of offering services or for purposes of engaging in business activity with the individual. This is true, even when the individual would otherwise be known to the business and accessible to the business over a different messaging platform for which the business has engaged the individual previously.

Still further, when users connect to messaging systems, each messaging system has its own authentication mechanism; some of which may provide strong authentication and some of which may provide weak authentication. The disparity between different messaging systems in terms of the strength of user authentication means that any integrated activity of the user within a particular messaging system may fail because the action a user is attempting to take may require stronger authentication than what the user was authenticated for within the particular messaging system.

Additionally, some services require more than one-factor to authenticate users. Two-factor authentication is often used to assure a service of a user's true identity. Something a user knows, such as a password may be a first factor whereas a second factor typically seeks to resolve something that user possesses, such as a phone. However, if a user commonly uses a device, such as a phone, then using the device as a second factor greatly reduces the effectiveness of two-factor authentication.

SUMMARY

In various embodiments, methods and a system for voice authentication within messaging systems are presented.

According to an embodiment, a method voice authentication within a messaging system is provided. Specifically, and in one embodiment, a randomly generated voice challenge is issued to a user who is successfully logged into session with a messaging platform in response to an operation requested by the user to an external service. Next, a determination is made as to whether to perform the operation with the external session based on whether a voice response returned from the user in response to the voice challenge is authenticated.

DETAILED DESCRIPTION

Figure 1A:
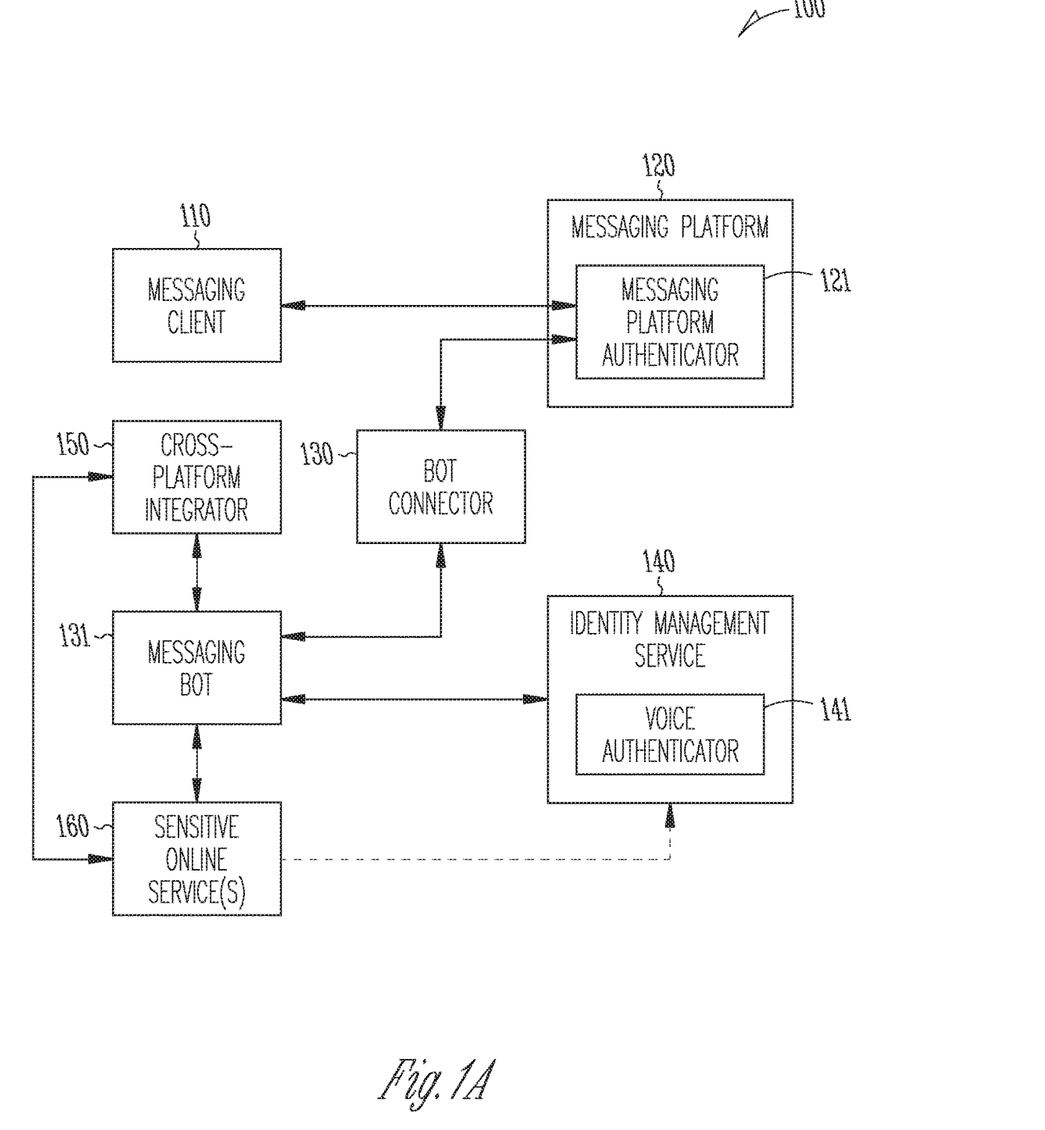
FIG. 1A is a diagram of a system for voice authentication within a messaging system, according to an example embodiment.

FIG. 1A is a diagram of a system 100 for voice authentication within a messaging system, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the voice authentication within messaging systems techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for voice authentication within a messaging system can be implemented in all, or some combination of the components shown in different hardware computing devices having one or more hardware processors.

The system 100 includes: a messaging client 110, a messaging platform 120, a bot connector 130, an identity management service 140, a cross-platform integrator 150, and at least one sensitive (network-based) online service 150. The messaging platform 120 includes a messaging platform authenticator 121. The bot connector 130 includes a messaging bot 131. The identity management service 140 includes voice authenticator 141.

The messaging client 110 can be processed on any processor-enabled device, such as but not limited to: a desktop computer, a laptop computer, a mobile phone, a tablet, a wearable processing device (watch, goggles, etc.), a processor-enabled vehicle interface within a vehicle, an intelligent appliance (light switch, lamp, garage door opener, refrigerator, television, stereo, etc.), a server, etc.

As used herein, a "messaging platform" refers to the software, interfaces, APIs, processing devices, and network connectivity used to perform messaging communications by users. A messaging platform includes, by way of example only, email, Short Message Service (SMS) text, instant message, and social-media applications (e.g., Facebook™, Slack™, Twitter™, Instagram™, Snap Chat™, LinkedIn™, etc.).

As used herein, a "messaging bot" of "bot" refers to a software application that is designed to engage in messaging activities in an automated manner as an active or passive participant within multiple disparate messaging platforms. A messaging bot 131 is a logical participant in a given chat session (messaging session or dialogue) for any given messaging platform. Moreover, a messaging bot 131 is configured to perform a variety of pre-configured automated actions within messaging platforms and/or outside the messaging platforms.

In an embodiment, the messaging client 110 (is also referred to as a "messaging application (app)" 110) includes no software changes or modifications for interaction with messaging bot 131 to be operational and perform the processing discussed herein and below. That is, from the perspective of the messaging platform 120 and the messaging app 110, the messaging bot 131 (also referred to as "messaging bot 131 or bot 131, herein) is a real user or participant (albeit the bot 131 is a logical participant).

In an embodiment, it is to be noted that the bot 131 need not processing on a same device as the corresponding messaging app 110. So, all a user operating messaging app 110 need do is identify a participant of a chat session (initiated with messaging app 110) as being messaging bot 110 (by directing a message within the messaging app 110 to a unique participant identifier associated with the bot 131). The actually device that executes the bot 131 can be a server or cloud (set of logically cooperating servers).

In some embodiments, the bot 131 may process within the local processing contexts and on the devices that process the corresponding messaging apps 110.

One benefit by retaining the bot 131 in a cloud processing environment is that any updates and enhancements to the bot 131 can be achieved without updates to the devices having the messaging app 110. Furthermore, a single base version of the bot 131 can exist in the cloud and support multiple disparate users through use of user-customization profiles that include user-specific configurations of the bots 131. In this manner, when a specific user identifies the bot 131 in the messaging app 110, a cloud service can cause the base bot to be initiated and apply the that user's specific preferences/ configurations to create a running instance of the bot 131 that is specific and customized to the user.

The bot 131 is configured to perform a variety of functions that are messaging platform 120 independent. That is, the bot 131 (through the bot connector 130) is designed to interact with the user of the messaging app 110 from the messaging platform interface and interact with the user from a different messaging client associated with a different messaging platform of the user. The bot connector 130 acts as an intermediary from the variety of disparate messaging platforms and translates messaging platform specific interfaces into a generic bot-based interface that is recognized and processed by the bot 131. Similarly, when the bot 131 responds in a generic bot-based interface, the bot connector 130 translates to a messaging-platform specific interface for deliver to the user in the messaging app 110.

It is noted that a plurality of customized bots can be provided with each bot 131 customized to perform one or more specific functions. For ease of illustration only a single messaging platform 120 and bot 131 is shown in the FIG. 1A.

The system 100 permits user activity across messaging platforms and with sensitive online services 160, which may or may not have interfaces associated with the messaging platforms. This is achieved through the processing of the identity management service 140 in connection with the bot connector and the messaging bot 131.

Initially, a user accesses messaging client 110 and is authenticated with a user-identifier and credential (such as a password, fingerprint, etc.) by the messaging platform authenticator 121. The messaging platform authenticator 121 authenticates the user for access to the user's account with the messaging platform 120.

When the user is logged in successfully to the messaging platform 120, the event of successful login, an automated message sent from the messaging app 100, or the user sent message through the messaging app 110 is detected or received by a bot connector 130.

The bot connector 130 has access to at least two pieces of information from the user: an event or an assumption that an event existed indicating that the user is successfully logged into the messaging platform 120, and a user identifier, which the user is identified by within the messaging platform 120.

The user identifier for the messaging platform 120 is sent by the bot connector 130 to messaging bot 131 along with an indication that the user is logged into the messaging platform 120 through the messaging app 110. The bot 131 relays the information to the identity management service 140 (using an identity management service Application Programming Interface (API)).

The identity management service 140 searches an index for the user identifier and is able to access a mapping of the user's identifier to a plurality of other identifiers that the user may use in connection with other messaging platform accounts and identifiers that the user may use in connection with external online services 150. The identity management service 140 may return to the bot 131 a global identifier for the user for use in connection with cross-platform communications or communications with online services (perhaps through communications with the cross-platform integrator 15).

When the user is accessing the messaging platform 120 for a first time or when the user has not previously registered for voice identification to determine the user's true identity during any messaging platform session before. The identity management service 140 may engage the bot 131 to register the use for voice authentication as a second factor authentication that is and can be performed during any messaging platform session when the user engages in cross-platform and or external service 160 operations from that messaging platform service. The bot 131 interacts with the bot connector 130 and the bot connector delivers and engages the use for the voice authentication registration within the messaging platform 120. This registration processing may also be prompted when the user during the session with the messaging platform 120 is attempting an operation for a first time that necessitates resolving the true identity of the user for authenticating the user for having the operation performed by the bot 131 and/or the channel integrator 150.

During registration, the user is requested by the bot 131 to repeat a sentence that is displayed to the user. The user is requested to record the sentence and return the recording back through the bot 131. The sentence is comprised of N randomly selected words obtained from a word list of size L. N and L are variables that can be configured for sensitivity requirements set by an administrator. N is at least 4 randomly selected words and the word list is comprised of at least 1000 random words for providing a minimum level of security and accuracy when performing the voice authentication. The random nature of this sentence (which does not have to be a grammatically correct sentence) prevents any potential attacker from being able to replay a previously recorded sentence. In fact, previously used random sentences, may in some embodiments, be stored such that assurances are made the no previously requested sentence that was voice recorded by the user for voice authentication is ever repeated. This is of particular important when the user's messaging client 110 is the user's mobile phone and the messaging platform is a Short-Messaging System (SMS) text-based messaging platform 120 because text-based systems typically save sent messages, such that should the user's phone be stolen, lost, or temporarily appropriated from the user, the hacker may have access to the previously recorded voice sentences. Moreover, most existing voice recognition systems use static text, asking the user to say a previously recorded secret message. This approach is unsuitable for messaging platform use because those systems by default automatically save all user-transmitted data, making it easy to replay a recording of the secret phrase. This is alleviated with the teachings presented herein by always requesting the user, in response to a voice challenge for a second factor voice authentication, record a new and never-used before randomly generated sentence.

The voice authenticator 141 performs the processing for issuing, generating, and authenticating voice challenges to the user during a session with the messaging platform 120. The voice authenticator 141 processes as module accessible to and in communication with the identity management service 140.

During registration of the user for voice authentication, the voice authenticator 141 trains for recognizing the voice of the user. This may entail having the user repeat whole paragraphs, asking the users to change his/her inflection and tone when saying some sentences. Moreover, in an embodiment, the voice authenticator 141 may randomly and periodically ask the user to repeat random words and return them as a recording through the bot 131 at different times of the day and days of the week in an attempt to capture different moods of the user in a random nature and to continually learn the voice of the user. The training is ongoing and learns as time progresses. Thus, training need not be on registration only but is ongoing and even when the voice authenticator is legitimately authenticating the user to a true identity for a desired operation with a different messaging platform and/or one of the external services 160. That is, when the voice authenticator 141 successfully authenticates a voice recording issued as a challenge to the user, the manner, tone, inflection, pitch, and rhythm of the voice recording may slightly change. These slight changes are noted by the voice authenticator 141 and used for learning the true voice of the user.

When the voice authenticator 141 successfully authenticates the user based on a randomly issued voice challenge, the identity management service 140 indicates that the user has been successfully authenticated for a requested operation during the session to the bot 131.

The bot 131 and/or the channel integrator 150 (through communication with the bot 131) may then engage a different messaging service from a different messaging platform or an external service 160 to perform the requested operation. This can be done in a number of manners to assure the external service 160 or different messaging service (herein after just external service 160) that the user and the operation requested is authenticated for processing by the external service 160.

This can be done in a variety of manners, such as through a token that the external service 160 identifies and can independently validate as being authenticate (such as through communications between the external service 160 and the identity management service 140, through decryption of the token and signature and/or key validation, and the like). In some cases, a trusted secure relationship between the bot 131 and/or channel integrator 150 and the external service 160 may also be used, such that the external service 160 can trust and relies on the assertion from the bot 131 and/or channel integrator 150 that the true identity of the user for the operation has been validated and authenticated. The bot 131 and/or channel integrator 150 provides the token or assertion along with an identifier (that the external service 160 recognizes as a valid account of the user with the external service) and an identifier for the requested operation to the external service 160. The external service 160 is then able to validate and authenticate the user to a valid account with the external service 160, identify the requested operation, and process the operation on behalf of the user with results or a status for processing the operation returned to the bot 131 and/or channel integrator 150. This can then be delivered back to the user within the messaging platform session of the user to the messaging client 110 (through the bot 131, bot connector 130, and messaging platform 120 to the messaging client 110.

The requested operation can a variety of operations, such as and not limited to, money transfers, payments for transactions, access to confidential and private data of the user, and the like.

The components of the system 100 permit a user to initially log in to a messaging platform session and perform out-of-band session operations with external services by using voice authentication (achieved through the session) to authenticate the user to the user's true identity and then perform that operation on behalf of the user with an external service 160. This has previously not been achieved because of the nature of processing within messaging platforms and the lack of inherent security of existing messaging platforms.

Figure 1B:
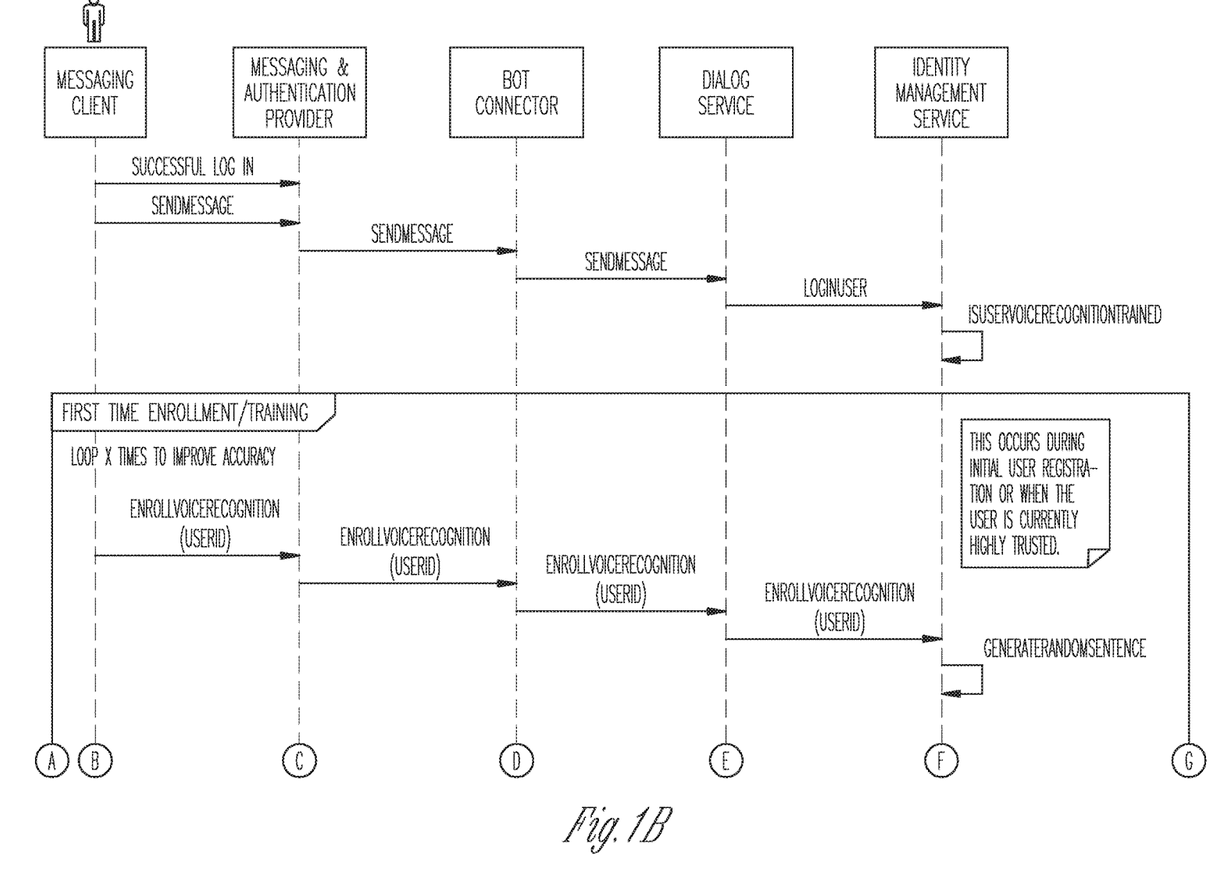
FIGS. 1B, 1C, and 1D are diagrams of a sample processing flow for voice authentication within a messaging system, according to an example embodiment.

FIG. 1B is a diagram of a sample processing flow for voice authentication within a messaging system, according to an example embodiment.

Figure 1C:
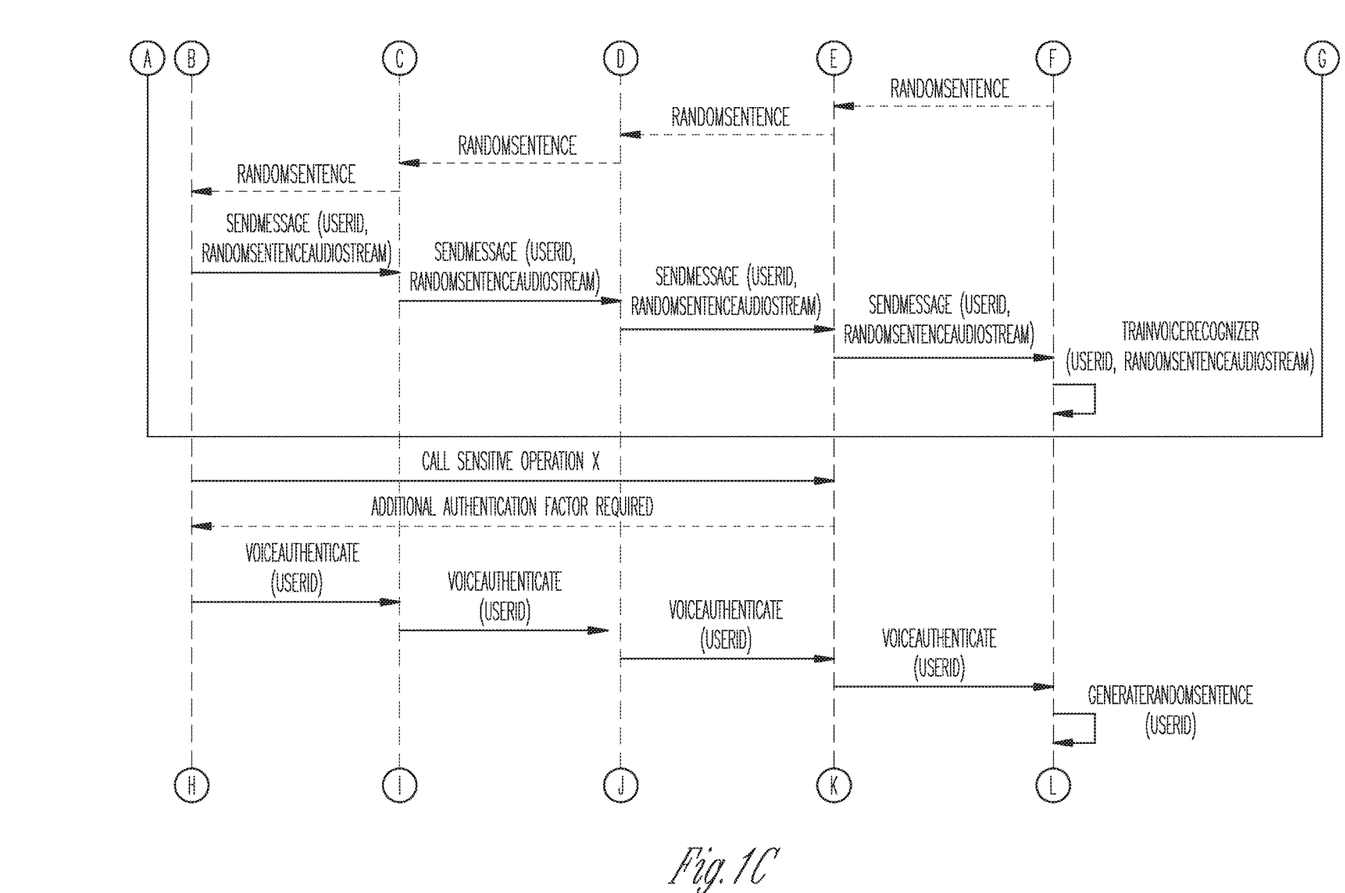
Figure 1D:
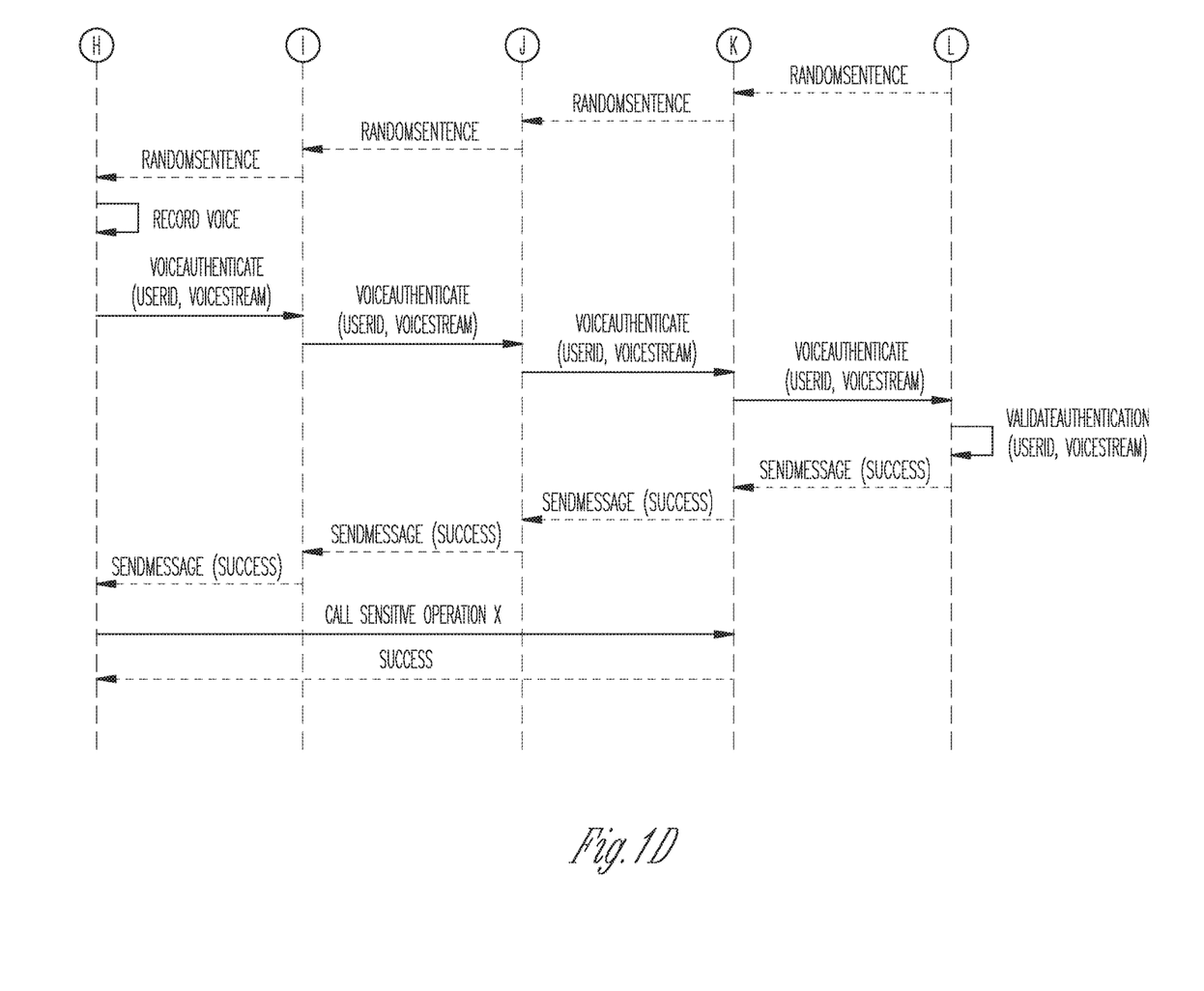

The FIGS. 1B, 1C, and 1D show a more detailed processing flow for two-factor voice authentication of a user within a messaging system (platform) a user session with a specific messaging platform 120. This provides enhanced security for performing cross-platform and external service operations that are initiated from within the session and conducted on behalf of the user during the session.

Initially, the user accesses a messaging client 110 and is prompted to login to the user's existing account with a messaging platform 120 through a messaging authentication provider 121 of the messaging platform 120. This is forwarded to the bot connector 130 along to the bot 131 (identified as dialogue service in the FIGS. 1B-1D) and onto the identity management service 140. Note that the user's identifier used for login and the type of messaging platform 120 are relayed to each of these entities during this processing.

The identity management service 140 then maps the messaging platform specific identifier for the user within the session to a global identity recognized and mapped to multiple known identifiers for the user on multiple messaging platforms and with the online service 160.

If this is the first time, the user is recognized within this messaging platform 120 or if the user has responded to a message from the bot 130 asking if the user wishes to register for voice authentication cross-platform and external service integration with the messaging platform 120, the voice authenticator 141 is initiated to engage the bot 131 and the user is asked to record and return randomly generated sentences (as discussed above) for purposes of training the voice authenticator 141 for voice authentication of the user. This can be an iterative process and can be configured to cease when the voice authenticator 141 believes that a desired level of accuracy and sensitivity has been reached for authenticating the voice of the user. This occurs during the user's session with the messaging platform 120.

After this has completed, the voice authenticator 141 is configured for voice authentication (as a second factor, the messaging session login being the first factor) of the user to a true identity during this session or subsequent session initiated by the user with the messaging platform 120 or any other different messaging platform session associated with different and disparate messaging platforms from the messaging platform 120.

During the same session or when the user subsequently logs into a different session with the messaging platform 120 (using a first factor authenticated by the messaging platform authenticator 121), the user may issue a sensitive operation through the session to the bot 131 requesting an external service 160 be performed during the session on behalf of the user. This prompts the identity management service 140 and the voice authenticator 141 to generate a random sentence of words as a challenge to the user and as a second factor voice authentication. The voice challenge is communicated to the bot 131 and onto the user operating the messaging client 110 as a message, which includes instructions to record the message and provide the recorded voice message back to the bot 131. The voice authenticator 141 then authenticates the recorded voice message based on voice metrics and scoring that were resolved during the training session. Assuming the voice authenticator 141 is able to authenticated the recorded voice message, the bot 131 is informed of the success and the bot 131 or the channel integrator 150 engage the external service 160 in the manners discussed above, the external service 160 performs the operation and returns results to the bot 131 and/or channel integrator 150, and the bot 131 and/or channel integrator 150 provides the results (or status) to the user within the session and through the messaging platform 120.

This illustrates how a user's can have his/her true identity authenticated through a second voice factor during a session with a messaging platform 120 and have an out-of-band messaging platform operation performed on behalf of the user with an external service 160 during the session. Security is enhanced because the voice challenges are random and not repeated for each iteration that the user requests a sensitive operation during the session or other sessions. Also, once trained for authentication within the messaging platform 120, the use can access and log into other different messaging platforms and use the voice authentication for having out-of-band messaging platform operations performed on behalf of the user with the external service.

The embodiments presented in the FIGS. 1A-1D and other embodiments are now discussed with reference to the FIGS. 2-4.

Figure 2A:
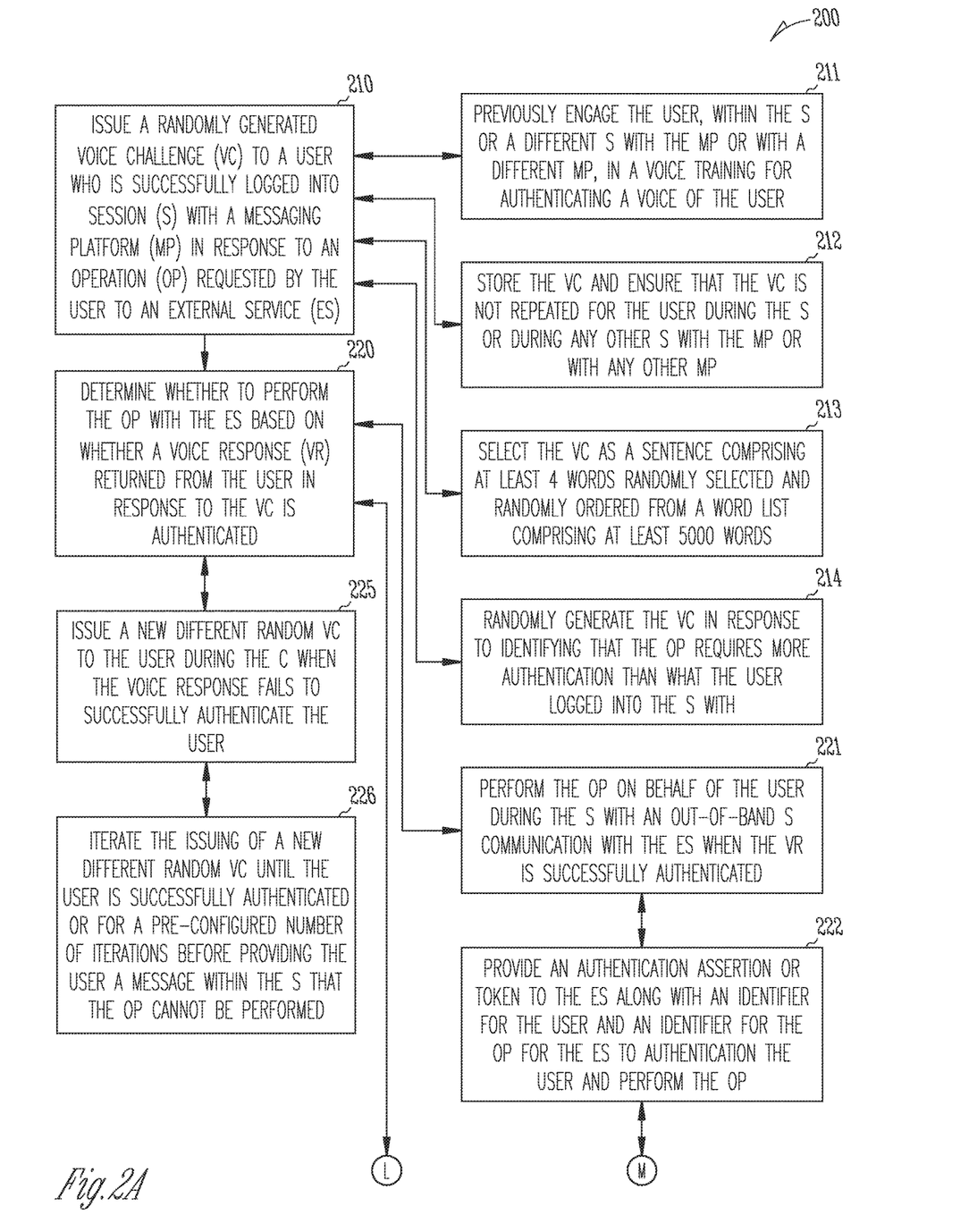
FIG. 2 is a diagram of a method for voice authentication within a messaging system, according to an example embodiment.
Figure 2B:
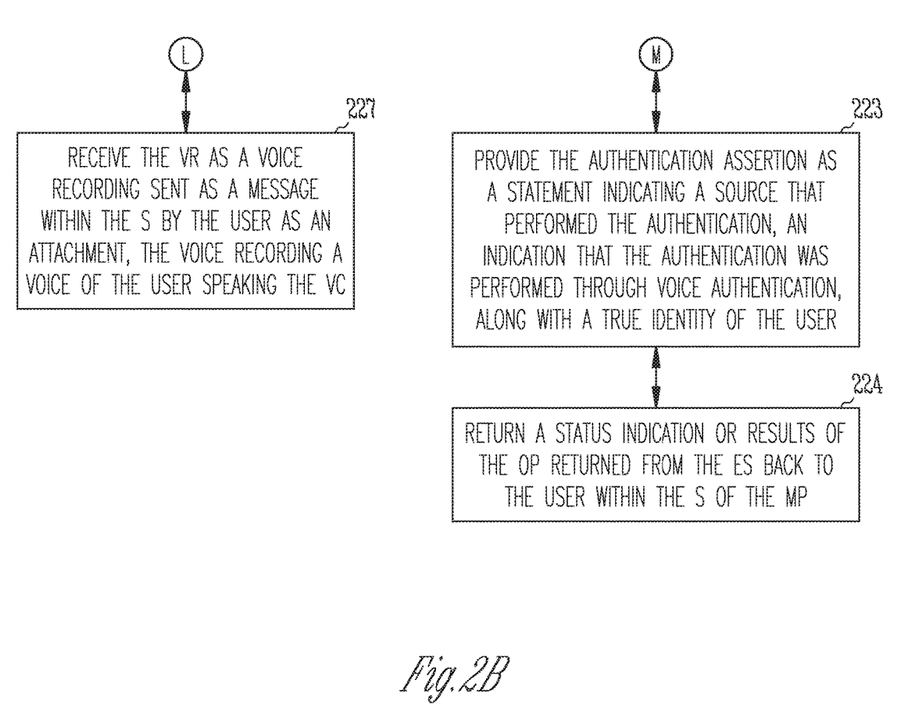

FIG. 2 is a diagram of a method 200 for voice authentication within a messaging system, according to an example embodiment. The software module(s) that implements the method 200 is referred to as an "messaging voice authenticator." The messaging voice authenticator is implemented as executable instructions programmed and residing within memory and/or a non-transitory computer-readable (processor-readable) storage medium and executed by one or more hardware processors of a hardware computing device. The processors of the device that executes the messaging voice authenticator are specifically configured and programmed to process the messaging voice authenticator. The messaging voice authenticator has access to one or more networks during its processing. The networks can be wired, wireless, or a combination of wired and wireless.

In an embodiment, the device that executes the messaging voice authenticator is the device or set of devices that process in a cloud processing environment.

In an embodiment, the device that executes the messaging voice authenticator is a server.

In an embodiment, the messaging voice authenticator is some combination of or all of: the bot connector 130, the bot 131, the identity management service 140, the voice authenticator 141, and the cross-platform integrator 150.

At 210, the messaging voice authenticator issues a randomly generated voice challenge to a user who has already successfully logged into a session with a messaging platform. The randomly generated voice challenge is issued in response to an operation requested by the user for execution by an external service during the session with the messaging platform.

In an embodiment, at 211, the messaging voice authenticator previously engaged the user within the session or a different prior session with the messaging platform or a completely different messaging platform where the user registered and was engaged in a voice training session with the messaging voice authenticator.

In an embodiment, at 212, the messaging voice authenticator stores the voice challenge and ensures that the voice challenge is not repeated for the user during the session or during any other session with the messaging platform or with other different messaging platforms.

In an embodiment, at 213, the messaging voice authenticator selects the voice challenge as a sentence that comprises at least four words randomly selected and randomly ordered from a word list comprising at least 5000 words.

In an embodiment, at 214, the messaging voice authenticator randomly generates the voice challenge in response to identifying that the operation requires more authentication of the user than what the user was logged into to establish the session with the messaging platform.

At 220, the messaging voice authenticator determines whether to perform the operation with the external service based on whether a voice response returned from the user in response to the voice challenge is successfully authenticated.

According to an embodiment, at 221, the messaging voice authenticator performs the operation on behalf of the user during the session with an out-of-band communication with the external service when the voice response is successfully authenticated.

In an embodiment of 221 and at 222, the messaging voice authenticator provides an authentication assertion or a token to the external service along with an identifier for the user and an identifier for the operation for the external service to authenticate the user and perform the operation.

In an embodiment of 222 and at 223, the messaging voice authenticator provides the authentication assertion as a statement indicating a source (the messaging voice authenticator) that performed the authentication and an indication that the authentication was performed through voice authentication along with a true identity of the user.

In an embodiment of 223 and at 224, the messaging voice authenticator returns a status indication or results of the operation returned from the external service back to the user within the session of the messaging platform.

In an embodiment, at 225, the messaging voice authenticator issues a new and different random voice challenge to the user during the session when the voice response fails to successfully authenticate the user.

In an embodiment of 225 and at 226, the messaging voice authenticator iterates the processing at 225 issuing a different new random voice challenge until the user is successfully authenticated or for a pre-configured number of iterations before providing the user a message within the session that the operation cannot be performed on behalf of the user.

Figure 3:
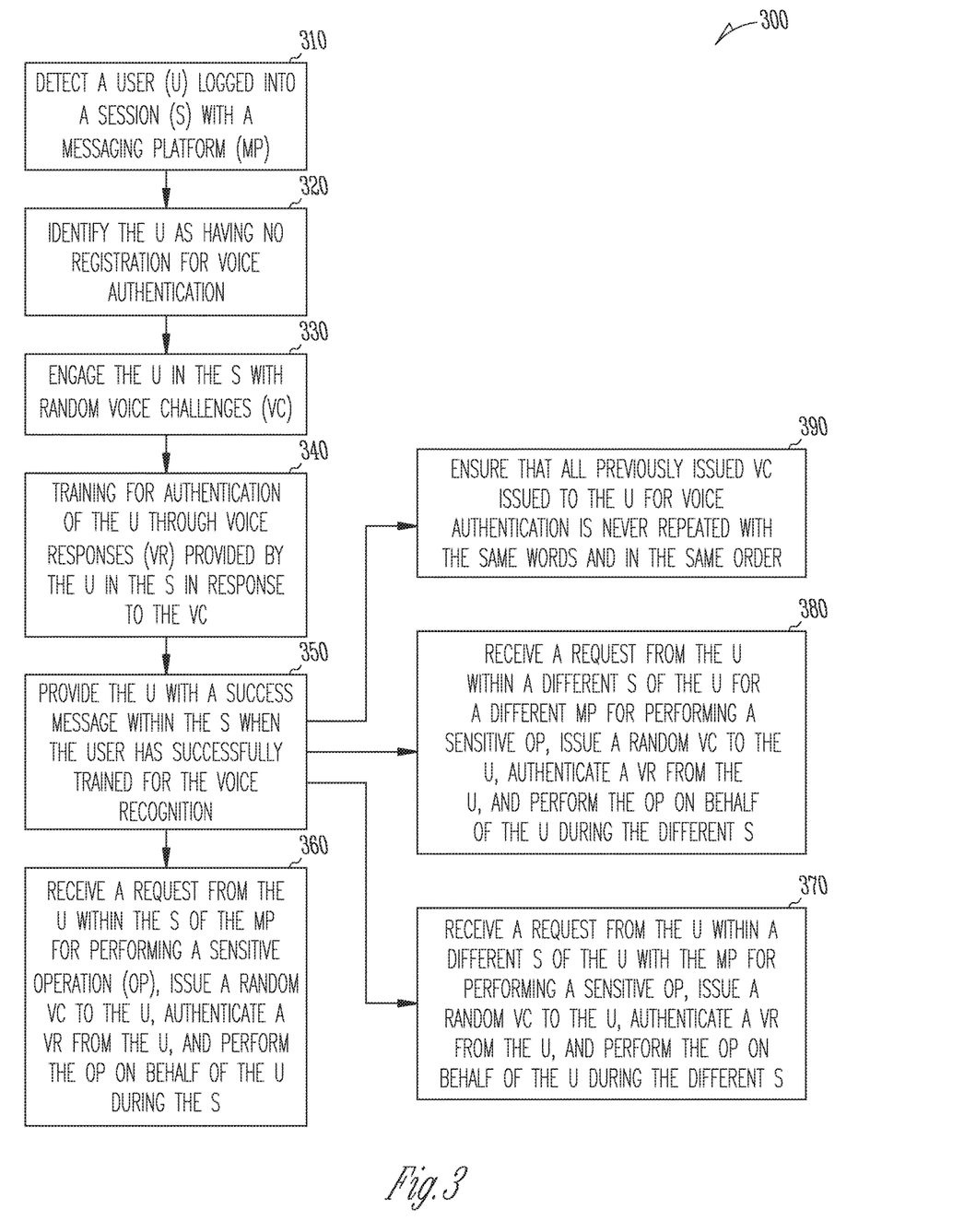
FIG. 3 is a diagram of another method for voice authentication within a messaging system, according to an example embodiment.

FIG. 3 is a diagram of another method 300 for voice authentication within a messaging system, according to an example embodiment. The software module(s) that implements the method 300 is referred to as an "cross-platform voice authenticator." The cross-platform voice authenticator is implemented as executable instructions programmed and residing within memory and/or a non-transitory computer-readable (processor-readable) storage medium and executed by one or more hardware processors of a hardware device. The processors of the device that executes the cross-platform voice authenticator are specifically configured and programmed to process the cross-platform voice authenticator. The cross-platform voice authenticator has access to one or more networks during its processing. The networks can be wired, wireless, or a combination of wired and wireless.

The cross-platform voice authenticator presents another and in some ways enhanced perspective of the method 200.

In an embodiment, the cross-platform voice authenticator is some combination of or all of: the bot connector 130, the bot 131, the identity management service 140, the voice authenticator 141, the cross-platform integrator 150, and the method 200.

In an embodiment, the device that executes the cross-platform voice authenticator is a server.

In an embodiment, the device that executes the cross-platform voice authenticator is a cloud processing environment.

At 310, the cross-platform voice authenticator detects a user logged into a session with a messaging platform.

At 320, the cross-platform voice authenticator identifies the user as having no registration for voice authentication.

At 330, the cross-platform voice authenticator engages the user in the session with random voice challenges.

At 340, the cross-platform voice authenticator trains for authentication of the user through voice responses provided by the user in the session in response to the voice challenges.

At 350, the cross-platform voice authenticator provides the user with a success message within the session when the user successfully trained for the voice recognition.

According to an embodiment, at 360, the cross-platform voice authenticator receives a request from the user within the session of the messaging platform for performing a sensitive operation. Next, the cross-platform voice authenticator issues a random voice challenge to the user. Then, the cross-platform voice authenticator authenticates a voice response from the user and performs the sensitive operation on behalf of the user during the session.

In an embodiment, at 370, the cross-platform voice authenticator receives a request from the user within a different session of the user with the messaging platform for performing a sensitive operation. Next, the cross-platform voice authenticator issues a random voice challenge to the user. Then, the cross-platform voice authenticator authenticates a voice response from the user and performs the sensitive operation on behalf of the user during the different session.

In still another embodiment, at 380, the cross-platform voice authenticator receives a request from the user within a different session of the user for a different messaging platform for performing the sensitive operation. Next, the cross-platform voice authenticator issues a random voice challenge. Then, the cross-platform voice authenticator authenticates a voice response from the user and performs the sensitive operation on behalf of the user during the different session.

In an embodiment, at 390, the cross-platform voice authenticator ensures that all previous issued voice challenges issued to the user for voice authentication is never repeated with the same words and in the same order.

Figure 4:
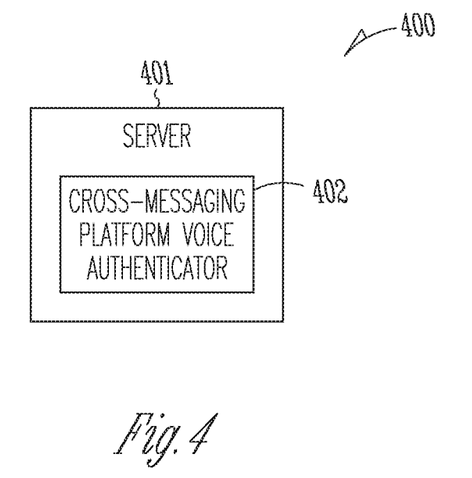
FIG. 4 is a diagram of another system for voice authentication within a messaging system, according to an example embodiment.

FIG. 4 is a diagram of another system 400 for voice authentication within a messaging system, according to an example embodiment, according to an example embodiment, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1D and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including a cross-messaging platform voice authenticator 402.

Cross-messaging platform voice authenticator 402 is configured to: 1) execute on at least one hardware processor of the server 401; 2) train for voice recognition of the user during a messaging session of the user with a messaging platform, 3) issue randomly generated voice challenges to the user when the user attempts an operation necessitating voice authentication within the messaging session, a different message session with the messaging platform, or a different messaging session with a different messaging platform.

In an embodiment, the cross-messaging platform voice authenticator 402 is further configured to: (iv) cause the operation to be processed by an external service to the messaging platform or the different messaging platform when voice responses from the user in response to the voice challenges are successfully authenticated.

In an embodiment of the previous embodiment, the cross-messaging platform voice authenticator 402 is further configured to: (v) ensure that the each issued voice challenge is unique and not repeated for the user.

In an embodiment, the cross-messaging platform voice authenticator 402 is all or some combination of: the bot connector 130, the bot 131, the identity management service 140, the voice authenticator 141, the cross-platform integrator 150, the system 100, the method 200, and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   issuing, by executable instructions that execute on a hardware processor from a non-transitory computer-readable storage medium as a messaging authenticator, a randomly generated voice challenge to a user who is successfully logged into session with a messaging platform and is a assigned a global user identifier for access to the messaging platform and other messaging platforms after receiving and identifying an operation requested by the user from the messaging platform to an external service associated with one of the other messaging platforms;
   determining, by the messaging authenticator, whether to perform the operation with the external service based on whether a voice response returned from the user based on whether the voice challenge is authenticated;
   performing, by the messaging authenticator, the operation with the external service on behalf of the user when the voice challenge is authenticated using the global user identifier for the user with the one of the other messaging platforms.

2. The method of claim 1, wherein issuing further includes previously engaging the user, within the session or a different session with the messaging platform or with a different messaging platform, in a voice training for authenticating a voice of the user.

3. The method of claim 1, wherein issuing further includes storing the voice challenge and ensuring that the voice challenge is not repeated for the user during the session or during any other session with the messaging platform or with any other messaging platforms.

4. The method of claim 1, wherein issuing further includes selecting the voice challenge as a sentence comprising at least 4 words randomly selected and randomly ordered from a word list comprising at least 5000 words.

5. The method of claim 1, wherein issuing further includes randomly generating the voice challenge in response to identifying that the operation requires more authentication than what the user logged into the session with.

6. The method of claim 1, wherein determining further includes performing the operation on behalf of the user during the session with an out-of-band session communication with the external service when the voice response is successfully authenticated.

7. The method of claim 6, wherein performing further includes providing an authentication assertion or token to the external service along with the global identifier for the user and an identifier for the operation for the external service to authenticate the user and perform the operation with the external service.

8. The method of claim 7 wherein providing further includes providing the authentication assertion as a statement indicating a source that performed the authentication, an indication that the authentication was performed through voice authentication, along with a true identity of the user.

9. The method of claim 8, wherein providing further includes returning a status indication or results of the operation returned from the external service back to the user within the session of the messaging platform.

10. The method of claim 1, wherein determining further includes issuing a new different random voice challenge to the user during the session when the voice response fails to successfully authenticate the user.

11. The method of claim 10 further comprising, iterating, by the messaging authenticator, the issuing of a new different random voice challenge until the user is successfully authenticated or for a pre-configured number of iterations before providing the user a message within the session that the operation cannot be performed.

12. The method of claim 1, wherein determining further includes receiving the voice response as a voice recording sent as a message within the session by the user as an attachment, the voice recording a voice of the user speaking the voice challenge.

13. A method, comprising:
   detecting, by executable instructions that execute on a hardware processor from a non-transitory computer-readable storage medium as a cross-platform voice authenticator, a user logged into a session with a messaging platform and assigned a global identifier for the messaging platform and other messaging platforms;
   identifying, by cross-platform voice authenticator, the user as having no registration for voice authentication;
   engaging, by cross-platform voice authenticator, the user in the session with random voice challenges;
   training, by cross-platform voice authenticator, on voice responses provided by the user in the session based on the voice challenges provided in the engaging for voice authentication of the user;
   providing, by cross-platform voice authenticator, the user with a success message within the session when the user has successfully trained for the voice recognition; and
   operating the cross-platform voice authenticator by providing authentication for subsequent voice responses of the user made based on subsequent random voice challenges issued to the user in order for the user to perform authenticated cross-messaging platform operations from the messaging platform to one of the other messaging platforms using the global identifier.

14. The method of claim 13 further comprising, receiving, cross-platform voice authenticator, a request from the user within the session of the messaging platform for performing a sensitive operation, issuing a random voice challenge to the user, authenticating a voice response from the user, and performing the sensitive operation on behalf of the user during the session.

15. The method of claim 13 further comprising, receiving, cross-platform voice authenticator, a request from the user within a different session of the user with the messaging platform for performing a sensitive operation, issuing a random voice challenge to the user, authenticating a voice response from the user, and performing the sensitive operation on behalf of the user during the different session.

16. The method of claim 13 further comprising, receiving, cross-platform voice authenticator, a request from the user within a different session of the user for a different messaging platform for performing a sensitive operation, issuing a random voice challenge to the user, authenticating a voice response from the user, and performing the sensitive operation on behalf of the user during the different session.

17. The method of claim 13 further comprising ensuring, cross-platform voice authenticator, that all previously issued voice challenges issued to the user for voice authentication is never repeated with the same words and in the same order.

18. A system (SST), comprising:
a server; and
a cross-messaging platform voice authenticator;
wherein the cross-messaging platform voice authenticator is configured to: (i) execute on at least one hardware processor of the server; (ii) train for voice recognition of the user during a messaging session of the user with a messaging platform, (iii) issue randomly generated voice challenges to the user when the user attempts an operation necessitating voice authentication within the messaging session, a different message session with the messaging platform, or a different messaging session with a different messaging platform, wherein a request that attempts the operation occurs within a first messaging platform and is directed for processing to a second messaging platform, and wherein the user is assigned a global identifier when successfully logging into any messaging platform and the global identifier is used when processing the operation on the second messaging platform.

19. The system of claim 18, wherein the cross-messaging platform voice authenticator is further configured to: (iv) cause the operation to be processed by an external service to the messaging platform or the different messaging platform when voice responses from the user in response to the voice challenges are successfully authenticated.

20. The system of claim 19, wherein the cross-messaging platform voice authenticator is further configured to: (v) ensure that the each issued voice challenge is unique and not repeated for the user.

* * * * *